May 12, 1942.　　　　L. W. WACHTER　　　　2,282,506
TRAILER
Filed Jan. 22, 1941　　　2 Sheets-Sheet 1

Inventor.
Lester W. Wachter.
by Parker & Carter
Attorneys.

May 12, 1942.  L. W. WACHTER  2,282,506
TRAILER
Filed Jan. 22, 1941  2 Sheets-Sheet 2
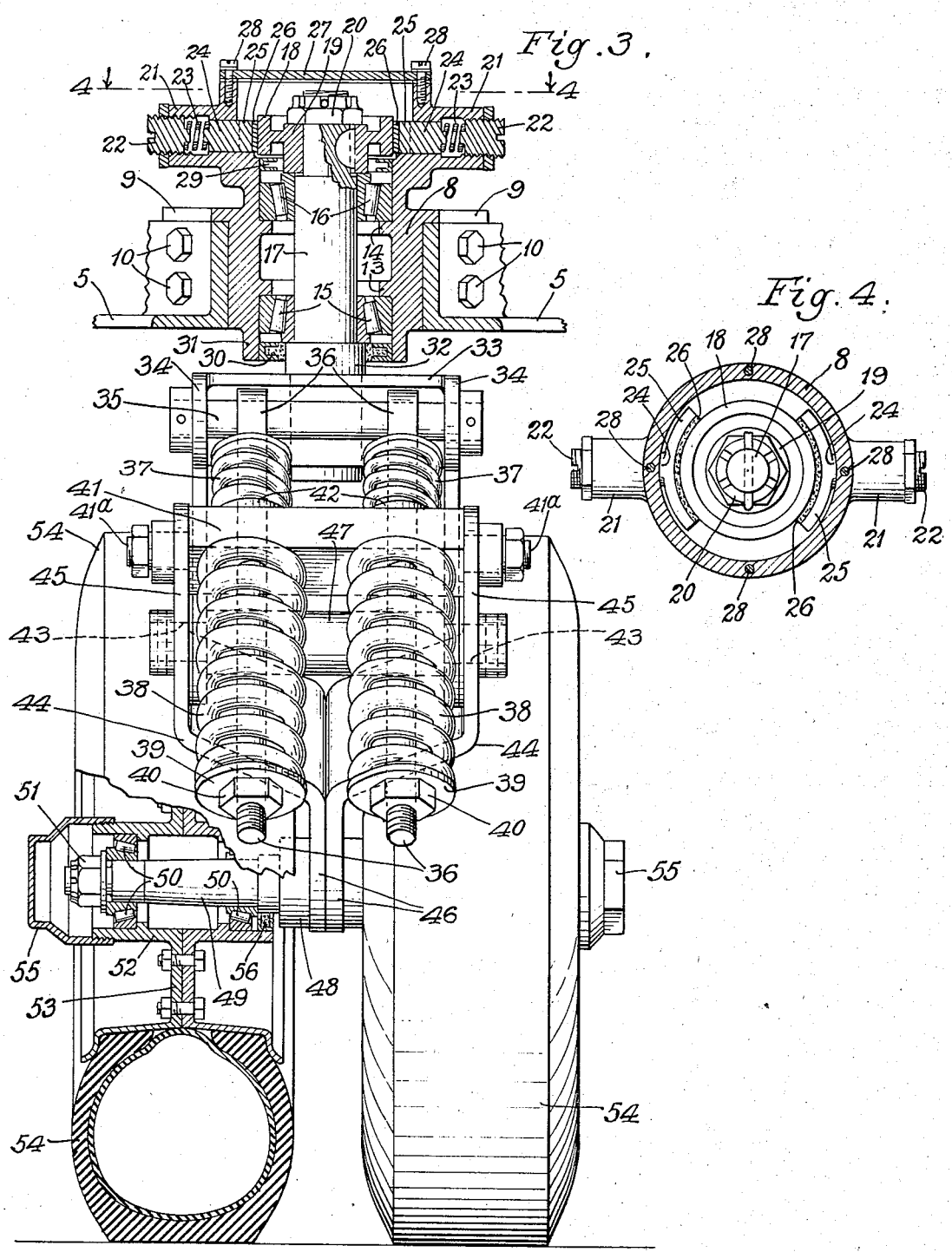

Patented May 12, 1942

2,282,506

UNITED STATES PATENT OFFICE 2,282,506

TRAILER

Lester W. Wachter, Streator, Ill., assignor to Anthony Company, Streator, Ill., a corporation of Illinois Application January 22, 1941, Serial No. 375,473

6 Claims. (Cl. 16—44)

This invention relates to a vehicle and primarily to the running gear. It may be provided in a vehicle of the trailer type or any other vehicles. It has for one object to provide a wheel supporting means embodying a rotary support.

Another object is to provide what may be called a caster assembly suitable for use in connection with a trailer vehicle.

Other objects will appear from time to time throughout the specification and claims.

My invention is illustrated more or less diagrammatically in the accompanying drawings, wherein—

Figure 3 is a vertical transverse partial section taken at line 3—3 of Figure 1, on an enlarged scale;

Figure 4 is a horizontal sectional detail taken at line 4—4 of Figure 1.

Like parts are indicated by like characters throughout the specification and drawings.

Figure 1:
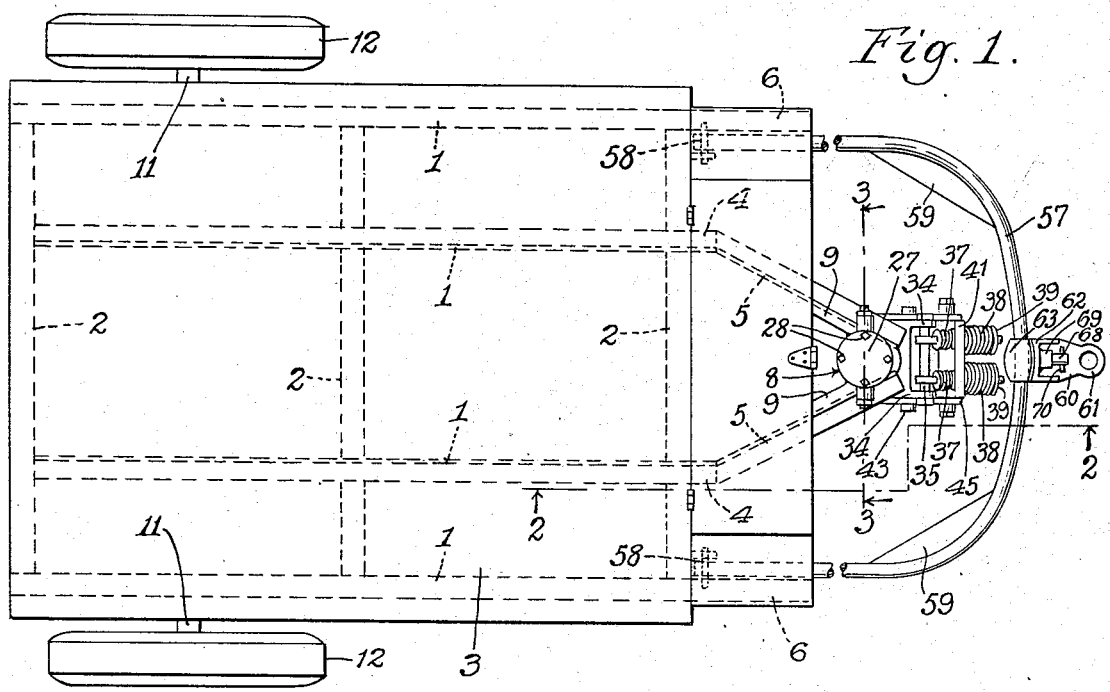
Figure 1 is a plan view with parts broken away.

While the device of the present invention may be used in many sorts of vehicles, as shown herein it is embodied in a trailer vehicle in which two wheels are provided to rotate about fixed axes and in which a caster assembly is provided for supporting a single or double wheel which is assembled to swing with the caster. Thus as shown, the trailer comprises longitudinal frame members 1, having one or more cross frame members 2 and it may embody a platform or load supporting member 3. Preferably adjacent the forward end of the vehicle, the side frame members 1 may be upwardly bent as at 4, and again horizontally bent as at 5. Extensions or continuations 6 of the side frame members 1 may extend beyond the upwardly bent portions, if desired.

The central longitudinal frame members are provided with converging portions 5, 5, which have secured adjacent their outer ends a housing 8. This housing may have integral laterally extending flange members 9 and the housing may be fastened to the forward ends of the members 5 by screws 10, 10 or otherwise. The caster assembly is supported in and about the housing 8 as is described below.

At the opposite end, the vehicle may be provided with an axle 11, upon which wheels 12 are mounted for rotation. The details of this part of the device are not shown as they form no essential part of the present invention. Suitable springing means may be provided if desired. Braking means for the wheels may also be provided.

Within the housing 8 are two inwardly directed flanges 13 and 14, 13 being the lowermost. Against the flange 13 is positioned an anti-friction bearing 15 and against the flange 14 is positioned an anti-friction bearing 16. A caster shaft 17 is journaled in the bearings 15 and 16. At its upper end it has secured to it a friction member 18 which although shown as circular may also be of segmental shape. This member is in the form of a hub 19 with suitable extensions and is held in place on the reduced end of the shaft 17 by a nut 20.

In one or more extensions 21, preferably formed integrally with the housing 8, are mounted adjustable plugs 22 and compression springs 23. Positioned inwardly of the compression springs are stems 24 to each of which is fastened on its inner face a brake or friction shoe 25, which may carry a friction element 26 in contact with the member 18. The upper end of the housing 8 is closed by a cover plate 27, which may be held in place by screws 28. Within the housing 8 and between the bearing 16 and the friction member 18 is a packing 29 arranged to prevent escape of lubricant from the bearing. A packing 30 is positioned within an extension 31 of the housing 8 and below the bearing 15.

An enlarged portion 32 of the shaft 17 extends downwardly below the housing extension 31. Rigidly secured to the portion 32 is a yoke 33 having ears or wings 34, 34. Positioned adjacent the outer ends or edges of the members 34 and out of line of the axis of rotation of the shaft 17, is a shaft 35 to which is secured a pair of pins 36, 36. About the upper ends of each of these pins is secured a compression spring 37 and about the lower portion of each pin is secured a compression spring 38. The lower ends of the spring 38 rest against collars 39 adjustably held in position by nuts 40. 41 is a perforated, pivoted separator element and each of the pins 36 passes through it. Collars 42 are positioned about the pins 36 and in contact with the separators 41.

Pivoted on a lower extension of the members 34 as at 43 is a pair of arms 44, 44 which are separated at their upper ends as at 45 and brought together at the lower ends as at 46. The separator 41 is pivoted between the ends 45 as at 41a. The yoke formed of the members 45, 46 is pivoted at 43 upon a shaft 47 which is received in the lower portions of the members 34.

At their lower ends the members 46 carry an axle 48, which as shown here has two tapered portions 49 upon which are mounted anti-friction bearings 50, 50. Nuts 51 hold the outer bearings in place. On each of the pairs of bearings is mounted a hub 52 of a wheel 53 which may carry the rubber tire 54. A cap 55 closes the outer end of each hub 52 and an oil ring 56 may close the inner end of each hub. While I have shown a double wheel assembly arranged as part of the caster, it is to be understood that one or more wheels may be positioned in the caster.

When the invention is applied to a trailer it is convenient to have a hitching means for the trailer. As shown, this means comprises a bail 57 which is pivoted as at 58 to any suitable part of the vehicle assembly. The bail may be reinforced as at 59 and preferably has secured adjustably to it a hitching means which includes a relatively flat member 60, having a ring portion 61 formed in or attached to it. It includes also a plate-like member 62 to which a bail receiving member 63 is fastened. This latter member is preferably arranged to receive the bail. Interposed between the members 62 and 63 is a friction member 64. Bolts 65—66 fasten the plate 62 to the member 63. The bolt 65 has the nut 67 and the bolt 66 has a head 68 which bears against the ears 69, the head 68 having projections 70 by means of which it may be readily tightened. Thus the hitching means may be loosened for adjustment on the bail and may then be tightened in place as desired.

It will be realized that while I have shown and described an operative device, still many changes in the size, shape, arrangement and disposition of parts may be made without departing materially from the spirit of my invention and I wish, therefore, that my showing be taken as in a large sense diagrammatic.

The use and operation of this invention are as follows:

I shall first describe the action of the caster because in whatever form the invention may be embodied, a caster is present. The purpose of the caster assembly is to provide a wheeled support, swiveling or turning means for the support and means to prevent wobbling or uncontrolled turning action and suitable springing for the wheel or wheels. The wheel mounting is such that the wheel normally travels to the rear of the axis of rotation of the stub shaft which supports the caster assembly. It thus follows automatically the direction in which the vehicle is pulled and permits turning of the vehicle about a short radius.

Swiveling action of the caster in the particular form of the invention here shown is accomplished by rotation of the vertical stub shaft in the bearings which are carried in the housing secured to the frame of the trailer. The friction devices which are installed in this housing prevent wobble and uncontrolled swinging of the assembly thus shown and are suitable for the purpose indicated but the invention is not limited to any particular friction means and for some purposes it may be utilized without any friction means.

Figure 2:
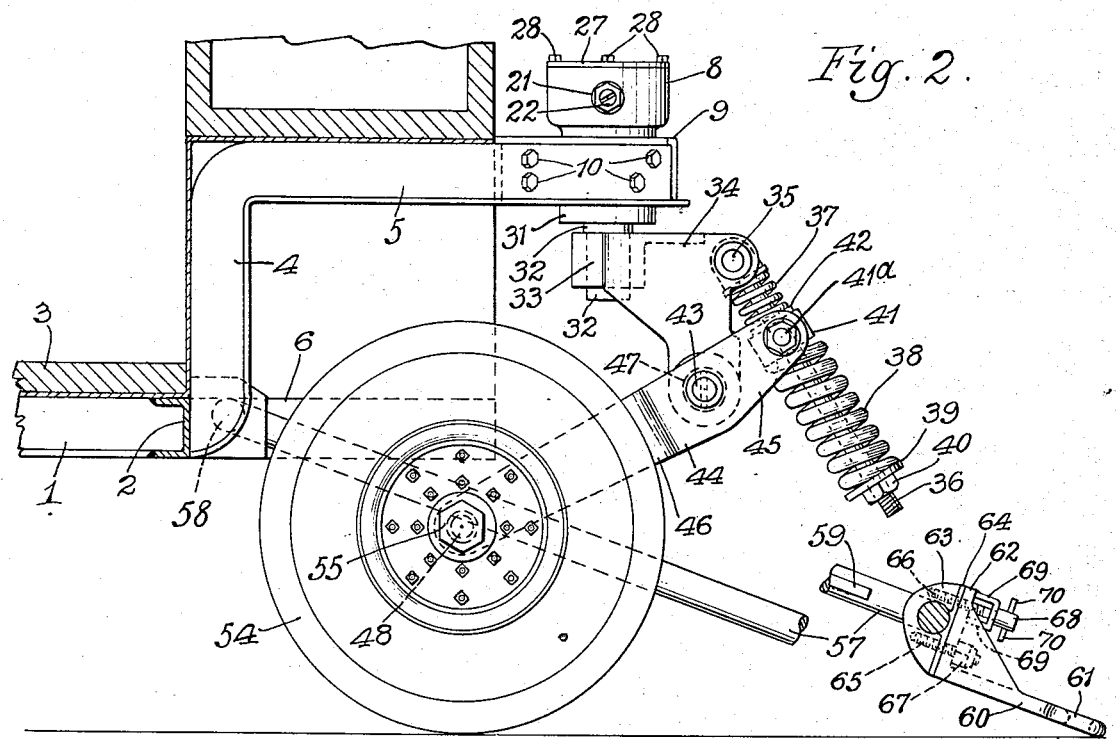
Figure 2 is a vertical longitudinal sectional detail taken at line 2—2 of Figure 1 on an enlarged scale with parts omitted and parts broken away.

With parts as shown, if the trailer is moved to the right from the position shown in Figure 2, the wheel will travel in the position shown. If the vehicle moves straight ahead, there will be little or no swiveling of the caster wheel. Up and down movement of the wheels is permitted by the springs or sets of springs shown and by this means the arm which carries the wheels may rotate up and down about its pivot point and the springs yieldably resist and control this up and down movement. As shown the springs are adjustable and this is ordinarily desirable.

When the vehicle in being pulled ahead is turned, the wheel assembly swivels to the right or left and the stub shaft which carries the wheel assembly rotates within the housing. The action which is described is made certain by the fact that the pivot point of the wheel carrying arm or yoke is not vertically aligned with the axis of rotation of the stub shaft, and it is as shown preferably forward of that axis in the direction of movement of the vehicle.

The invention is not limited to the particular details of the vehicle frame shown and the caster assembly might equally well be applied to many different sorts of frames.

The pivoted bail which is shown is also not an essential feature. For the particular design of trailer illustrated herewith, it is desirable but it might be omitted and other hitch and bail means might be used.

Where in the specification and claims, such expressions as caster, yoke, shoe, arm, frame and the like are used, they are to be understood not as limiting terms but as terms used for convenience. In some of the claims the frame-like assembly upon which the springs and the wheel arm are mounted is called a yoke. Obviously other language might be used instead of yoke and the term yoke in this connection means any structural form which can be used to support the parts which are supported upon the so-called yoke.

I claim:

1. In combination in a caster, a fixed hollow housing and a stub shaft mounted therein for rotation, and a member fixed to said shaft and provided with a pair of ears, said ears positioned forwardly of the axis of said shaft, and a second pair of ears on said member positioned below first pair of said ears and forwardly of the axis of said shaft; and a wheel arm pivoted to said second ears, and an axle carried by said arm adjacent its lower end, and a pair of wheels mounted on said axle, one on either side of said arm, the forward end of said arm projecting forwardly of its pivot point; a spring carrier pivoted adjacent said first mentioned ears and a member secured to the upper end of said arm, a pair of springs mounted on said spring carrier, said springs adapted yieldingly to resist movement of said arm.

2. In combination in a caster, a fixed hollow housing and a stub shaft mounted therein for rotation, and a member fixed to said shaft and provided with a pair of ears, said ears positioned forwardly of the axis of said shaft, and a second pair of ears on said member positioned below first pair of said ears and forwardly of the axis of said shaft; and a wheel arm pivoted to said second ears, said wheel arm formed of a pair of members separated at the pivot and converging below and rearwardly of the pivot, and an axle carried by said arm adjacent its lower end, and a pair of wheels mounted on said axle, one on either side of said arm, the forward end of said arm projecting forwardly of its pivot point; a spring carrier pivoted adjacent said first mentioned ears and a member secured to the upper end of said arm, a pair of springs mounted on said spring carrier, said springs adapted yieldingly to resist movement of said arm.

3. In combination in a caster, a fixed hollow housing and a stub shaft mounted therein for rotation, and a member fixed to said shaft and provided with a pair of ears, said ears positioned forwardly of the axis of said shaft, and a second pair of ears on said member positioned below first pair of said ears and forwardly of the axis of said shaft; and a wheel arm pivoted to said second ears, said wheel arm formed of a pair of members separated at the pivot and converging below and rearwardly of the pivot, and an axle carried by said arm adjacent its lower end, and a pair of wheels mounted on said axle, one on either side of said arm, the forward end of said arm projecting forwardly of its pivot point; a spring carrier pivoted at one end adjacent said first mentioned ears and a member secured to the upper end of said arm, a pair of springs mounted on said spring carrier, said springs adapted yieldingly to resist movement of said arm.

4. In combination in a caster, a fixed hollow housing and a stub shaft mounted therein for rotation, and a member fixed to said shaft and provided with a pair of ears, said ears positioned forwardly of the axis of said shaft, and a second pair of ears on said member positioned below first pair of said ears and forwardly of the axis of said shaft; and a wheel arm pivoted to said second ears, said wheel arm formed of a pair of members separated at the pivot and converging below and rearwardly of the pivot, and an axle carried by said arm adjacent its lower end, and a pair of wheels mounted on said axle, one on either side of said arm, the forward end of said arm projecting forwardly of its pivot point; a spring carrier pivoted at one end adjacent said first mentioned ears and a member secured to the upper end of said arm, a pair of springs mounted on said spring carrier, one above and one below the forward end of said arm, said springs adapted yieldingly to resist movement of said arm.

5. A road vehicle including a horizontally disposed bracket extending forwardly from the body thereof, a bearing housing carried by the bracket, a vertically disposed caster shaft rotatably mounted in the housing, thrust resisting means adapted to prevent longitudinal movement of the shaft, a yoke rigidly mounted on and extending horizontally forward from the shaft, beneath the bracket, vertically disposed spaced ears depending downwardly from each side of the yoke, horizontal shafts fixed in said ears, one adjacent the upper, another adjacent the lower forward extensions of the ears, a bifurcated lever pivoted on the lower horizontal shaft, straddling the ears, extending rearwardly down and forwardly up from its pivot shaft, the forks converging to form a single lever arm behind and below the ears at a point behind the projected axis of the caster shaft, an axle carried by the lever arm behind said projected axis, a wheel on the axle, on each side of the lever arm, an apertured abutment member extending between the forward extremities of the forks, spaced tie rods pivoted on the upper horizontal shaft, extending through the apertures in the abutment member, adjustable spring seats adjacent the opposed ends of the tie rods, springs encircling the tie rods, one between the abutment member and the upper horizontal shaft, the other between the abutment member and the spring seat on the tie rod.

6. In combination, a generally vertically disposed caster shaft, a generally horizontally disposed yoke, mounted thereon for rotation about the axis of the shaft, spaced ears depending downwardly from the yoke in front of the shaft, a bifurcated lever straddling the two ears and in pivot relationship with them upon a generally horizontal axis, the forks extending inwardly beyond the ears to form a single downwardly and rearwardly extending lever, an axle on the lower end of the lever located behind the axis of the shaft, wheels on the axle on either side of the lever, the forks of the lever extending upwardly and forwardly from their pivot connection with the ears, spring means located between the forks and extending along a line generally perpendicular to the plane defined by the two forks and interposed between the forks and the yoke to resist rotary movement of the lever in both directions.

LESTER W. WACHTER.